United States Patent [19]

Toyama et al.

[11] Patent Number: 5,104,938

[45] Date of Patent: Apr. 14, 1992

[54] THERMOPLASTIC POLYMER COMPOSITION

[75] Inventors: Yasuo Toyama; Takumi Miyachi, both of Yokkaichi, Japan

[73] Assignee: Japan Synthetic Rubber Co., Ltd., Tokyo, Japan

[21] Appl. No.: 317,841

[22] Filed: Mar. 2, 1989

[30] Foreign Application Priority Data

Mar. 7, 1988 [JP] Japan .................................. 63-53133

[51] Int. Cl.$^5$ ............................................. C08L 53/02
[52] U.S. Cl. ....................................................... 525/92
[58] Field of Search .......................................... 525/92

[56] References Cited

U.S. PATENT DOCUMENTS

| | | | |
|---|---|---|---|
| 4,124,654 | 11/1978 | Abolins et al. | 525/92 |
| 4,377,647 | 3/1983 | Durbin et al. | 525/92 |
| 4,429,076 | 6/1980 | Saito et al. | 525/57 |
| 4,628,072 | 12/1986 | Shiraki et al. | 525/92 |

FOREIGN PATENT DOCUMENTS

| | | | |
|---|---|---|---|
| 56-115352 | 9/1981 | Japan . | |
| 0018752 | 1/1984 | Japan | 525/92 |

*Primary Examiner*—John C. Bleutge
*Assistant Examiner*—Thomas Hamilton, III.
*Attorney, Agent, or Firm*—Oblon, Spivak, McClelland, Maier & Neustadt

[57] ABSTRACT

A thermoplastic polymer composition consisting essentially of:

(a) at least one member selected from the group consisting of a block copolymer consisting of a polymer block comprising at least 60% by weight of an alkenyl aromatic compound and a polymer block comprising at least 60% by weight of a conjugated diene compound and a hydrogenated product of said copolymer;

(b) a thermoplastic polyurethane elastomer and (c) at least one member selected from the group consisting of the following (c-1) and (c-2) components:

(c-1): a copolymer of an alkenyl aromatic compound with at least one compound selected from the group consisting of an unsaturated carboxylic acid and its derivative, (c-2): a modified (co)polymer obtained by reacting an isocyanate with a (co)polymer of at least one compound selected from the group consisting of an alkenyl aromatic compound and a conjugated diene compound; or a hydrogenated product of the modified (co)polymer or a mixture of the isocyanate-modified (co)polymer with the hydrogenated product, wherein the (a)/(b) weight ratio is 2/98–98/2 and the proportion of the (c) component is 1–100 parts by weight per 100 parts by weight of a total of the (a) and (b) components. The above composition is excellent in compatibility between the (a) component and the (b) component, and hence, has excellent heat resistance, mechanical strengths and wear resistance.

22 Claims, No Drawings

THERMOPLASTIC POLYMER COMPOSITION

This invention relates to a thermoplastic polymer composition having excellent compatibility and further having excellent heat resistance, mechanical strengths and wear resistance, and more particularly, to a thermoplastic polymer composition comprising an alkenyl aromatic compound-conjugated diene compound block copolymer, a thermoplastic polyurethane elastomer and a copolymer of an alkenyl aromatic compound with an unsaturated carboxylic acid and/or its derivative, and/or an isocyanate-modified rubber.

Alkenyl aromatic compound-conjugated diene compound block copolymers obtained by anionic polymerization with an alkyllithium compound as a polymerization initiator in a hydrocarbon solvent exhibit high rubbery elasticity even when they are not vulcanized and can be molded by a conventional molding machine for thermoplastic resins. They are also inexpensive and can be subjected to scrap-regeneration. In view of these respects, the above block polymers are thermoplastic elastomers whose recent demands are particularly high. However, the above block copolymer is inferior in heat resistance, wear resistance and chemical resistance.

On the other hand, thermoplastic polyurethane elastomers are excellent in wear resistance, mechanical strengths, oil resistance and cold resistance, and hence, are often utilized in large amounts in sport shoe soles, hoses, tubes and the like. However, they are inferior in water resistance, moldability and the like.

The alkenyl aromatic compound-conjugated diene compound block copolymers and the thermoplastic polyurethane elastomers have useful performances as mentioned above and therefore attempts have been made to obtain more useful materials by combining the two. However, the two are poor in compatibility with each other and blends thereof are much inferior in properties.

Thus, many attempts have been made to improve the compatibility between the two. For example, Japanese Patent Application Kokai No. 115,352/81 discloses an attempt to improve the compatibility of the alkenyl aromatic compound-conjugated diene compound block copolymer with polyurethane polymer by bonding dicarboxylic acid groups or their derivatives to the former to modify the same.

Nevertheless, the above method requires such complicated operation as modification of the alkenyl aromatic compound-conjugated diene compound block copolymer, during which modification undesirable phenomena in respect of physical properties such as gelation and breakage of molecule are caused. In addition, the resulting modified block copolymer has still insufficient compatibility with the polyurethane elastomer.

The present inventors have made extensive research for the purpose of improving the compatibility between the above-mentioned alkenyl aromatic compound-conjugated diene compound block copolymer and the thermoplastic polyurethane elastomer and developing a composition having advantageous physical properties, and have consequently found that the above purpose can be achieved by blending, as a third component, a copolymer of an alkenyl compound with an unsaturated carboxylic acid or its derivative, or an isocyanate-modified (co)polymer of an alkenyl aromatic compound alone or with a conjugated diene compound.

According to this invention, there is provided a thermoplastic polymer composition consisting essentially of:
(a) a block copolymer consisting of a polymer block comprising at least 60% by weight of an alkenyl aromatic compound and a polymer block comprising at least 60% by weight of a conjugated diene compound, or a hydrogenated product of the block copolymer or both of them,
(b) a thermoplastic polyurethane elastomer and
(c) at least one member selected from the group consisting of the following (c-1) and (c-2) components:
(c-1) copolymers of an alkenyl aromatic compound with an unsaturated carboxylic acid or its derivative or both thereof
(c-2) isocyanate-modified (co)polymers obtained by reacting an isocyanate with a polymer of an alkenyl aromatic compound, a polymer of a conjugated diene compound or a copolymer of an alkenyl aromatic compound with a conjugated diene compound, or a hydrogenated product of the above isocyanate-modified (co)polymer, or a mixture of the isocyanate-modified (co)polymer and the above hydrogenated product,
wherein the (a)/(b) weight ratio is 2/98-98/2 and the proportion of the (c) component is 1-100 parts by weight per 100 parts by weight of a total of the (a) and (b) components.

The block copolymer used as the (a) component comprises preferably 5-95%, more preferably 10-90%, and most preferably 15-70% by weight of the alkenyl aromatic compound, and may have a linear, branched or radial structure, though the structure is not critical.

Specifically, the block copolymer includes those represented by the following formulas:

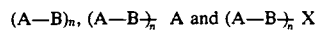

wherein A represents a polymer block comprising at least 60% by weight of an alkenyl aromatic compound, B represents a copolymer block comprising at least 60% by weight of a conjugated diene compound, X represents a coupling agent residue and n is an integer of 1 or more.

In the present specification, the term "copolymer block comprising at least 60% by weight of an alkenyl aromatic compound" means to include block of homopolymer of an alkenyl aromatic compound and block of copolymer of at least 60% by weight, preferably at least 80% by weight, of an alkenyl aromatic compound with a conjugated diene compound. The term "copolymer block comprising at least 60% by weight of a conjugated diene compound" used herein means to include block of homopolymer of a conjugated diene compound and block of copolymer of at least 60% by weight, preferably at least 80% by weight, of a conjugated diene compound with an alkenyl aromatic compound. The copolymer blocks may have such a structure that the alkenyl aromatic compound is linked at random or may be the so-called tapered blocks in which the amount of the alkenyl aromatic compound linked is gradually increased.

The alkenyl aromatic compound includes styrene, α-methylstyrene, p-methylstyrene, vinylxylene, monochlorostyrene, dichlorostyrene, monobromostyrene, dibromostyrene, fluorostyrene, p-t-butylstyrene, ethylstyrene, vinylnaphthalene and the like, and these may be used alone or in admixture of two or more. Of these compounds, styrene is particularly preferable.

The conjugated diene compound includes 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene, straight chain conjugated pentadiene, substituted conjugated pentadienes, straight chain conjugated hexadiene, substituted conjugated hexadienes and the like. These compounds may be used alone or in admixture of two or more. Among them, 1,3-butadiene and 2-methyl-1,3-butadiene are particularly preferable.

The coupling agent from which X is derived includes polyhalogenated hydrocarbons such as dibromethane and the like; metal polyhalides such as silicon tetrachloride, tin tetrachloride and the like; polyepoxides such as epoxidized soybean oil and the like; polycarboxylic acid esters; polybasic acid esters; polybasic acid anhydrides; polyfunctional aldehydes; polyfunctional ketones; polyvinyl aromatic compounds; etc.

The weight average molecular weight of the whole of the block copolymer is preferably 10,000–500,000, more preferably 20,000–300,000.

The block copolymer may be a combination of those having different structures or those having different alkenyl aromatic compound contents.

As the (a) component, hydrogenation products of the above block copolymers may be used, and include, for example, styrene-ethylene-propylene block copolymers and styrene-ethylene-butylene block copolymers.

The thermoplastic polyurethane elastomer used as the (b) component in this invention is a polymer obtained by subjecting a long chain polyol, a short chain glycol and diisocyanate as the starting materials to addition polymerization to form urethane linkages in the molecule and includes those which are conventionally used in shoe sole, hose, tube, adhesive and the like.

The long chain polyol which is one of the starting materials for the thermoplastic polyurethane elastomer includes poly(1,4-butylene adipate), poly(1,6-hexane adipate), polycaprolactone, polyethylene glycol, polypropylene glycol, polyoxytetramethylene glycol and the like. The short chain glycol includes ethylene glycol, 1,4-butanediol, 1,4-hexanediol and the like. The diisocyanate includes tolylene diisocyanate, 4,4'-diphenylmethane diisocyanate, hexamethylene diisocyanate, isophorone diisocyanate and the like. The long chain polyol and the diisocyanate form a soft segment and the short chain glycol and the diisocyanate form a hard segment.

The molecular weight of the thermoplastic polyurethane elastomer is preferably 5,000–500,000, more preferably 10,000–300,000.

The copolymer as the (c-1) component is a copolymer of an alkenyl aromatic compound with an unsaturated carboxylic acid or its derivative or both of them, and the alkenyl aromatic compound includes styrene, α-methylstyrene, p-methylstyrene, vinylxylene, monochlorostyrene, dichlorostyrene, monobromostyrene, dibromostyrene, fluorostyrene, p-t-butylstyrene, ethylstyrene, vinylnaphthalene and the like, and among them, styrene is preferable. The unsaturated carboxylic acid includes maleic acid, fumaric acid, itaconic acid, acrylic acid, crotonic acid, cis-4-cyclohexene-1,2-dicarboxylic acid and the like and anhydrides and imides of these acids. Among them, maleic anhydride is preferred.

The production of the above-mentioned copolymer of an alkenyl aromatic compound with an unsaturated carboxylic acid or its derivative or both of them can be conducted by various methods. For example, solution polymerization method, bulk polymerization method, bulk-suspension polymerization method and the like may be used. Said copolymer may be modified by blending a rubber in the course of production of the copolymer. Said rubber includes, for example, polybutadiene rubber, butyl rubber, styrene-butadiene rubber, styrene-butadiene block copolymer, acrylonitrile rubber, ethylene-propylene rubber, natural rubber and the like.

The isocyanate-modified (co)polymer used as the (c-2) component in this invention can be produced by, for example, the following method:

A conjugated diene compound or an alkenyl aromatic compound is homopolymerized with a lithium type initiator, or preferably, the conjugated diene and the alkenyl aromatic compound are random copolymerized or block copolymerized. Thereafter, the active terminals of the resulting (co)polymer is reacted with an isocyanate to obtain the isocyanate-modified (co) polymer.

The hydrogenated product of the isocyanate-modified (co)polymer can be obtained by saturating the unsaturated bonds due to the conjugated diene component in the isocyanate-modified (co)polymer with hydrogen.

The conjugated diene compound includes specifically those mentioned as to the (a) component, and 1,3-butadiene and 2-methyl-1,3-butadiene are particularly preferable.

The alkenyl aromatic compound includes specifically those mentioned as to the (a) component, and styrene is particularly preferable.

The isocyanate compound includes aromatic isocyanates, for example, aromatic diisocyanates such as 2,4-tolylene diisocyanate, 2,6-tolylene diisocyanate, diphenylmethane diisocyanate, triphenylmethane diisocyanate, naphthalene diisocyanate, tolidine diisocyanate, p-phenylene diisocyanate and xylylene diisocyanate; aromatic triisocyanates such as triphenylmethane triisocyanate, tris-(isocyanatophenyl) thiophosphate, benzene-1,2,4-triisocyanate, naphthalene-1,3,7-triisocyanate and the like; and other aromatic isocyanates such as naphthalene-1,2,5,7-tetraisocyanate, phenyl isocyanate and the like; and aliphatic isocyanates such as hexamethylene diisocyanate, methylcyclohexane diisocyanate and the like. Preferred are aromatic diisocyanates, aromatic triisocyanates and dimers and trimers of aromatic isocyanate compounds. Moreover, adducts obtained by reacting the aromatic isocyanate with a polyol or polyamine may also be used as the aromatic isocyanate compound. More preferable are aromatic polyisocyanate compounds such as 2,4-tolylene diisocyanate, diphenylmethane diisocyanate, naphthalene diisocyanate and the like. The amount of the isocyanate compound used is 0.1 to 10 equivalents, preferably 0.2–3 equivalents, in terms of isocyanate group per mole of lithium atom.

In the composition of this invention, the proportion of the alkenyl aromatic compound-conjugated diene compound block copolymer or its hydrogenation product to the thermoplastic polyurethane elastomer is such that the (a) component/the (b) component weight ratio is 2/98–98/2, preferably 5/95–95/5 and more preferably 7/93–80/20. The proportion of the (a) component is less than 2% by weight, the hot water resistance and moldability are inferior, and when the proportion of the (a)

component exceeds 98% by weight, the heat resistance and wear resistance are inferior.

In this invention, the compatibility between the (a) component, the block copolymer or its hydrogenation product and the (b) component, the thermoplastic polyurethane elastomer can be greatly improved by using the (c) component.

The (c) component is used in an amount of 1-100 parts by weight, preferably 2-80 parts by weight, per 100 parts by weight of a total of the (a) component and the (b) component. When the amount is less than 1 part by weight, the compatibility is not improved and when the amount exceeds 100 parts by weight, the flexibility, rubbery elasticity and processability which are inherently possessed by the (a) and (b) components are deteriorated.

Also, the composition of this invention can, if necessary, be subjected to a modification such as maleinization, carboxylation, hydroxylation, epoxidation, halogenation, sulfonation or the like and cross-linking such as sulfur-crosslinking, peroxide-crosslinking, metal ion-crosslinking, electron beam-crosslinking, silane-crosslinking or the like.

The thermoplastic resin composition of this invention comprising the (c-1) component is excellent particularly in heat resistance and tensile characteristics. Also, the thermoplastic resin composition of this invention comprising the (c-2) component is excellent particularly in flexibility.

The thermoplastic resin composition of this invention may, if necessary, contain further additives which are used in conventional thermoplastic resins. For example, plasticizers such as phthalic acid esters and the like; fillers or reinforcing agents such as silica, talc, glass fibers and the like; and in addition, antioxidants, ultraviolet absorbers, antistatic agents, flame retardants, lubricants, foaming agents, coloring agents, pigments, nucleating agents, crosslinking agents, crosslinking co-agents and the like may be added alone or in admixture of two or more.

If necessary, rubbery polymers such as SBR, NBR, BR, EPT, EPR, NR, IR, 1,2-polybutadiene, AR, CR, IIR, HSR and the like may be added to the thermoplastic polymer composition of this invention.

Moreover, the thermoplastic polymer composition of this invention may, if necessary, be blended with a thermoplastic resin such as polystyrene resin, polyethylene resin, polypropylene resin, diene resin, polyvinyl chloride resin, polyvinyl acetate resin, polycarbonate resin, polyacetal resin, polyamide resin, polyester resin, polyether resin, polysulfone, polyphenylene sulfide or the like.

In this invention, the mixing of the (a), (b) and (c) components and the mixing of the thermoplastic resin composition of this invention with the above-mentioned plasticizer, filler, rubber, resin and the like can be conducted by a conventional method using a conventional means such as extruder (single screw or twin-screw extruder), roll mill, Banbury mixer, kneader, Henschel mixer or the like.

The molding of the thermoplastic resin composition thus obtained can be carried out by a conventional method, for example, extrusion molding, injection molding, blow molding, press molding, calendering or the like, to obtain practically useful molded articles. Furthermore, if necessary, the molded articles may be subjected to processing such as coating, plating or the like.

The composition of this invention have excellent heat resistance, wear resistance, processability, flexibility, low temperature characteristics, temperature dependency, compatibility, coatability, printability, hot stampability, adhesiveness, deep drawing properties, hot water resistance, rubbery elasticity, rubbery texture, flexibility, sliding resistance, stress-crack resistance and the like, and therefore, utilizing these properties, the composition can be used in (1) a sheet for trays for edible meat and fresh fish, a sheet for packing vegetables and fruits and a sheet for ice confectionary containers, (2) a film for wrapping foods, sundry goods and industrial materials and a laminate of rubber products, resin products, fabrics, leathers and elastic tapes for paper diaper, (3) hoses, tubes, belts and the like; (4) footwear such as sports shoes, leisure shoes, fashion sandal shoes, leather shoes and the like; (5) domestic electric appliances such as television, stereo, cleaner and the like; (6) interior and exterior decorative parts for automobiles such as bamper parts, body panels, side shields and the like; (7) raw materials for hot-melt adhesives, pressure sensitive adhesives, contact type adhesives, spray type adhesives and the like; (8) asphalt blends such as road-paving material, water-proofing sheet, pipe-coating and the like; (9) other daily necessaries, leisure goods, toys and industrial articles.

This invention is further explained in detail below referring to Examples. However, it should not be construed that this invention be restricted to the Examples.

PREPARATION OF BLOCK COPOLYMERS A AND B

In a washed and dried autoclave provided with a stirrer and a jacket were placed 4,500 g of cyclohexane and 1 g of tetrahydrofuran under a nitrogen atmosphere, and the internal temperature thereof was elevated to 70° C.

Subsequently, a hexane solution containing 0.4 g of n-butyllithium was added to the resulting solution, after which 120 g of styrene was added thereto. The resulting mixture was subjected to polymerization for 60 minutes. Subsequently, 360 g of butadiene was added to the polymerization mixture, and the resulting mixture was subjected to polymerization for 60 minutes. Moreover, 120 g of styrene was added to the polymerization mixture and the resulting mixture was subjected to polymerization for 60 minutes. In each of the above polymerizations, the temperature of the polymerization system was maintained at 70° C. After the completion of the last polymerization, 2,6-di-t-butyl p-cresol was added to the polymerization mixture, after which the cyclohexane was removed by heating to obtain a linear block copolymer. The bound styrene content of the block copolymer obtained was 40% by weight, and the weight average molecular weight of the block copolymer was 180,000. This is hereinafter referred to as Block Copolymer A.

The same procedure as above was repeated, to obtain a linear block copolymer having a bound styrene content of 15% by weight and a weight average molecular weight of 180,000. This is hereinafter referred to as Block Copolymer B.

PREPARATION OF BLOCK COPOLYMER C

In the same autoclave as above were placed 4,500 g of cyclohexane and 1 g of tetrahydrofuran, and the internal temperature was elevated to 70° C.

Subsequently, a hexane solution containing 0.8 g of n-butyllithium was added to the resulting solution, and then, 420 g of styrene was added thereto. The resulting mixture was subjected to polymerization for 30 minutes. Subsequently, 180 g of butadiene was added to the polymerization mixture and the resulting mixture was subjected to polymerization for 60 minutes. Moreover, 0.6 g of tetrachlorosilane was added to the polymerization mixture and the resulting mixture was allowed to stand for 30 minutes. In each of the above polymerizations, the temperature of the polymerization system was maintained at 70° C.

After the completion of the reaction, 2,6-di-t-butyl-p-cresol was added to the polymerization mixture, and thereafter, the cyclohexane was removed by heating, to obtain a radial block copolymer. The bound styrene content of the block copolymer obtained was 70% by weight and the weight average molecular weight thereof was 220,000. This is hereinafter referred to as Block Copolymer C.

PREPARATION OF ISOCYANATE-MODIFIED RANDOM COPOLYMER D

In a nitrogen purged reactor were placed 2,000 g of cyclohexane, 400 g of butadiene, 100 g of styrene and 10 g of tetrahydrofuran, after which 0.4 g of n-butyllithium was added to the resulting mixture. The resulting mixture was subjected adiabatically to polymerization at 30°-90° C.

After the polymerization conversion had reached 100%, diphenylmethane diisocyanate was added to the polymerization mixture in a proportion of 2 equivalents per lithium atom and the resulting mixture was subjected to reaction. To the reaction mixture was added 2,6-di-t-butyl-p-cresol, after which the cyclohexane was removed by heating to obtain a polymer.

The bound styrene content of this polymer was 20% by weight and the weight average molecular weight thereof was 200,000. This is hereinafter referred to as Modified Rubber D.

PREPARATION OF ISOCYANATE-MODIFIED BLOCK COPOLYMER E

In a nitrogen-purged reactor were placed 4,500 g of cyclohexane and 1 g of tetrahydrofuran, and then, the internal temperature was elevated to 70° C.

Subsequently, a hexane solution of 0.5 g of n-butyllithium was added to the resulting mixture and then 120 g of styrene was added to the mixture, after which the mixture was subjected to polymerization for 60 minutes. Subsequently, 360 g of butadiene was added to the polymerization mixture, and the resulting mixture was subjected to polymerization for 60 minutes. Furthermore, 120 g of styrene was added to the polymerization mixture and then the resulting mixture was subjected to polymerization. After the completion of the polymerization, diphenylmethane diisocyanate was added to the polymerization mixture in a proportion of 2 equivalents per lithium atom, and the resulting mixture was subjected to reaction. Subsequently, 2,6-di-t-butyl-p-cresol was added thereto and thereafter the cyclohexane was removed by heating to obtain a polymer. The bound styrene content of this polymer was 40% by weight and the weight average molecular weight of the polymer was 180,000. This is hereinafter referred to as Modified Rubber E.

PREPARATION OF ISOCYANATE-MODIFIED POLYSTYRENE AND POLYBUTADIENE

In a nitrogen-purged reactor were placed 2,000 g of cyclohexane, 500 g of styrene or 500 g of butadiene and 10 g of tetrahydrofuran, and then, 0.4 g of n-butyllithium was added to the resulting mixture. The resulting mixture was subjected to polymerization at 30°-0° C. under adiabatic conditions.

After the polymerization conversion had reached 100%, diphenylmethane diisocyanate was added to the polymerization mixture in a proportion of 2 equivalents per lithium atom, and the resulting mixture was subjected to reaction. Subsequently, 2,6-di-t-butyl-p-cresol was added to the reaction mixture, after which the cyclohexane was removed by heating to obtain an isocyanate-modified polystyrene or an isocyanate-modified polybutadiene, which is hereinafter referred to as Modified Polymer F or G, respectively.

PREPARATION OF MALEIC ANHYDRIDE-MODIFIED BLOCK COPOLYMER

To 100 parts by weight of Block Copolymer A were added 1.5 parts by weight of maleic anhydride and 0.2 part by weight of phenothiazine, and the resulting mixture was kneaded in an extruder to effect modification reaction. The modified block copolymer thus obtained had a bound maleic acid content of 0.6 part by weight and a toluene-insoluble gel of 2% by weight. This is hereinafter referred to as Modified Block Copolymer A.

EXAMPLES 1-11 AND COMPARATIVE EXAMPLES 1-8

One of the block copolymers obtained above, polyurethane and one of the styrene resins shown in Table 1 were kneaded with a compounding recipe as shown in Table 1 in a plastomill (product of Toyoseiki Seisakusho) at 190° C at 110 rpm for 5 minutes to obtain a press-molded product, and the physical properties thereof were determined. The other materials set forth in Table 1 were specifically as follows:
Hydrogenated block copolymer:
  Kraton G (product of Shell Chemical) (hydrogenated styrene butadiene block copolymer having a bound styrene content of 30% by weight)
Polyurethane elastomer:
  Miractran EISOMNAT (product of Nippon Miractran) (adipate type, hardness (JIS A): 80)
Styrene-maleic anhydride copolymer:
  Dylark #332 (product of Sekisui Plastic Co., Ltd.) (bound maleic anhydride content: 15% by weight)
Styrene-methacrylic acid copolymer:
  Ryulex A-15 (product of Dainippon Ink and Chemical Inc.) (bound methacrylic acid content: 15% by weight)
Styrene-maleimide copolymer:
  Supperlex M-25 (product of Mitsubishi Monsanto) (bound maleimide content: 13% by weight)
Polystyrene:
  Toporex 525 (product of Mitsuitoatsu Chemical) (MI=10)
Styrene-butadiene rubber:
  SBR SL552 (product of Japan Synthetic Rubber) (bound styrene content: 24% by weight, Mooney viscosity $ML_{1+4}$ (100° C.): 55)

The physical properties were measured by the following methods:

Vicat softening point:
ASTM D1525 (load: 1 kg)
Tensile properties:
According to JIS K6301
Taber abrasion:
ASTM D1044 (abrasion wheel H-22)
Transparency:
Press-molded sheet having a thickness of 1 mm was visually evaluated with the following ratings:
Transparent: ◯, translucent: Δ, opaque: ×
Hot water resistance:
Tensile test piece was immersed in hot water at 70° C. for 10 days, and thereafter, subjected to tensile test according to JIS K6301. The hot water resistance was evaluated by the proportion [retention (%)] of the tensile strength obtained to the tensile strength before the immersion.

In Examples 1-9, the composition of this invention was used, and the results indicate that the heat resistance, tensile properties, abrasion resistance and transparency are superior.

In Comparative Examples 1 and 2, the (c) component in this invention was not used. The results indicate that the compatibility between the (a) component and the (b) component is not satisfactory, and the tensile properties, abrasion resistance and hot water resistance are inferior.

In Comparative Example 3, the (c) component in this invention was used in an amount larger than the range of this invention and the results indicate that the heat resistance is enhanced but the modulus is increased and the transparency and abrasion resistance are inferior.

In Comparative Example 4, polystyrene which is not a copolymer with saturated carboxylic acid or its derivative was substituted for the (c) component. The results indicate that the transparency and abrasion resistance are inferior.

In Comparative Example 5, the isocyanate-unmodified styrene-butadiene rubber used was outside the scope of this invention, and the results indicate that the heat resistance, abrasion resistance and transparency are inferior.

In Comparative Example 6, the amount of the (a) component used was smaller than the range of this invention, and the results indicate that heat resistance is inferior.

In Comparative Example 7, the amount of the (a) component used was larger than the range of this invention, and the results indicate that heat resistance and abrasion resistance are inferior.

In Comparative Example 8, a composition of polyurethane elastomer and maleic acid-modified block copolymer was used, and the results indicate that the composition is inferior in heat resistance and abrasion resistance to the present composition.

In Examples 10 and 11, the abrasion resistance and hot water resistance are superior.

TABLE 1

|  |  | Example |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
| Component (a) | Block Copolymer A (part by wt.) | 50 | 30 | 70 | — | 10 | — | — | 50 | — | 50 | 50 |
|  | Block Copolymer B (part by wt.) | — | — | — | 50 | — | — | — | — | 50 | — | — |
|  | Block Copolymer C (part by wt.) | — | — | — | — | — | 20 | — | — | — | — | — |
|  | Hydrogenated block copolymer (part by wt.) | — | — | — | — | — | — | 50 | — | — | — | — |
| Component (b) | Polyurethane elastomer (part by wt.) | 50 | 70 | 30 | 50 | 90 | 80 | 50 | 50 | 50 | 50 | 50 |
| Component (c) | Styrene-maleic anhydride copolymer (part by wt.) | 5 | 30 | 80 | — | 50 | — | 5 | — | — | — | — |
|  | Styrene-methacrylic acid copolymer (part by wt.) | — | — | — | 20 | — | — | — | — | — | — | — |
|  | Styrene-maleimide copolymer (part by wt.) | — | — | — | — | — | 10 | — | — | — | — | — |
|  | Modified Rubber D (part by wt.) | — | — | — | — | — | — | — | 10 | — | — | — |
|  | Modified Rubber E (part by wt.) | — | — | — | — | — | — | — | — | 20 | — | — |
|  | Modified Polymer F (part by wt.) | — | — | — | — | — | — | — | — | — | 10 | — |
|  | Modified Polymer G (part by wt.) | — | — | — | — | — | — | — | — | — | — | 10 |
|  | Modified Block Copolymer A (part by wt.) | — | — | — | — | — | — | — | — | — | — | — |
|  | Polystyrene (part by wt.) | — | — | — | — | — | — | — | — | — | — | — |
|  | Styrene-butadiene rubber (part by wt.) | — | — | — | — | — | — | — | — | — | — | — |
| Physical properties | Vicat softening point (°C.) | 60 | 75 | 86 | 71 | 74 | 66 | 70 | 54 | 57 | 57 | 51 |
|  | 300% Modulus (kgf/cm$^2$) | 65 | 76 | 98 | 69 | 73 | 67 | 69 | 46 | 56 | 52 | 46 |
|  | Tensile strength (kgf/cm$^2$) | 250 | 320 | 350 | 320 | 290 | 280 | 280 | 210 | 240 | 240 | 200 |
|  | Elongation (%) | 800 | 650 | 610 | 700 | 680 | 700 | 800 | 780 | 830 | 760 | 800 |
|  | Taber abrasion (mg/1000 times) | 180 | 95 | 110 | 230 | 190 | 140 | 180 | 250 | 160 | 160 | 170 |
|  | Transparency | ◯ | ◯ | ◯ | Δ | Δ | Δ | Δ | ◯ | ◯ | ◯ | ◯ |
|  | Hot water resistance (%) | 82 | 84 | 88 | 83 | 80 | 80 | 86 | 83 | 83 | 80 | 81 |

|  |  | Comparative Example |
|---|---|---|
|  |  | 1 2 3 4 5 6 7 8 |

TABLE 1-continued

| | | | | | | | | | |
|---|---|---|---|---|---|---|---|---|---|
| Component (a) | Block Copolymer A (part by wt.) | 50 | — | 50 | 50 | 50 | 0.5 | 99.5 | — |
| | Block Copolymer B (part by wt.) | — | 50 | — | — | — | — | — | — |
| | Block Copolymer C (part by wt.) | — | — | — | — | — | — | — | — |
| | Hydrogenated block copolymer (part by wt.) | — | — | — | — | — | — | — | — |
| Component (b) | Polyurethane elastomer (part by wt.) | 50 | 50 | 50 | 50 | 50 | 99.5 | 0.5 | 50 |
| Component (c) | Styrene-maleic anhydride copolymer (part by wt.) | — | — | 110 | — | — | 5 | 5 | — |
| | Styrene-methacrylic acid copolymer (part by wt.) | — | — | — | — | — | — | — | — |
| | Styrene-maleimide copolymer (part by wt.) | — | — | — | — | — | — | — | — |
| | Modified Rubber D (part by wt.) | — | — | — | — | — | — | — | — |
| | Modified Rubber E (part by wt.) | — | — | — | — | — | — | — | — |
| | Modified Polymer F (part by wt.) | — | — | — | — | — | — | — | — |
| | Modified Polymer G (part by wt.) | — | — | — | — | — | — | — | — |
| | Modified Block Copolymer A (part by wt.) | — | — | — | — | — | — | — | 50 |
| | Polystyrene (part by wt.) | — | — | — | 20 | — | — | — | — |
| | Styrene-butadiene rubber (part by wt.) | — | — | — | — | 10 | — | — | — |
| Physical properties | Vicat softening point (°C.) | 46 | 41 | 88 | 49 | 41 | 54 | 46 | 46 |
| | 300% Modulus (kgf/cm$^2$) | 45 | 39 | 120 | 70 | 39 | 36 | 32 | 45 |
| | Tensile strength (kgf/cm$^2$) | 150 | 110 | 340 | 230 | 110 | 190 | 180 | 180 |
| | Elongation (%) | 600 | 620 | 80 | 330 | 630 | 650 | 660 | 650 |
| | Taber abrasion (mg/1000 times) | 600 | 710 | 560 | 580 | 900 | 320 | 530 | 510 |
| | Transparency | X | X | O | X | X | X | X | Δ |
| | Hot water resistance (%) | 70 | 68 | 79 | 77 | 71 | 69 | 78 | 76 |

As shown in Table 1, a mixture of a block copolymer and a polyurethane is low in Vicat softening point, tensile strength and elongation and large in abrasive wear. Therefore, it cannot stand practical use. Also, the transparency thereof is inferior and the results indicate that the two components are not compatible with each other at all.

However, when a copolymer of an alkenyl aromatic compound with an unsaturated carboxylic acid or its derivative or both thereof is blended with the block copolymer and the polyurethane as in this invention, a remarkable increase of Vicat softening point is seen, and a composition having high heat resistance is obtained. Also, the tensile strength and elongation are increased, and an enhancement of abrasion resistance is seen. Further, the composition obtained is superior in transparency.

When an isocyanate-modified rubber is blended, the composition obtained is similarly superior in tensile strength, elongation and abrasion resistance, and has an elevated Vicat softening point.

What is claimed is:

1. A thermoplastic polymer composition consisting essentially of:
   (a) at least one member selected from the group consisting of a block copolymer consisting of a polymer block comprising at least 60% by weight of an alkenyl aromatic compound and a polymer block comprising at least 60% by weight of a conjugated diene compound and a hydrogenated product of said copolymer;
   (b) a thermoplastic polyurethane elastomer and
   (c) at least one member selected from the group consisting of the following (c-1) and (c-2) components:
      (c-1): a copolymer of an alkenyl aromatic compound with at least one compound selected from the group consisting of an unsaturated carboxylic acid and its derivative,
      (c-2): a modified (co)polymer obtained by reacting an isocyanate with a (co)polymer of at least one compound selected from the group consisting of an alkenyl aromatic compound and a conjugated diene compound; or a hydrogenated product of the modified (co)polymer or a mixture of the isocyanate-modified (co)polymer with the hydrogenated product,
   wherein the (a)/(b) weight ratio is 2/98-98/2 and the proportion of the (c) component is 1-100 parts by weight per 100 parts by weight of a total of the (a) and (b) components.

2. The thermoplastic polymer composition according to claim 1, wherein the (a) component block copolymer is a linear, branched or radial block copolymer comprising 5-95% by weight of an alkenyl aromatic compound.

3. The thermoplastic polymer composition according to claim 2, wherein the (a) component block copolymer comprises 10-90% by weight of an alkenyl aromatic compound.

4. The thermoplastic polymer composition according to claim 1, wherein the (a) component block copolymer is a block copolymer represented by one of the following formulas:

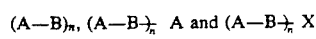

wherein A represents a polymer block comprising at least 60% by weight of an alkenyl aromatic compound, B represents a polymer block comprising at least 60% by weight of a conjugated diene compound, X represents a coupling agent residue and n is an integer of 1 or more.

5. The thermoplastic polymer composition according to claim 1, wherein the (a) component block copolymer consists of a block of a homopolymer of an alkenyl aromatic compound or a block of a copolymer of an alkenyl aromatic compound with a conjugated diene compound in which the proportion of the alkenyl aromatic compound is at least 80% by weight, and a block of a homopolymer of a conjugated diene compound or a block of a copolymer of a conjugated diene compound and an alkenyl aromatic compound in which the proportion of the conjugated diene compound is at least 80% by weight.

6. The thermoplastic polymer composition according to claim 5, wherein the alkenyl aromatic compound of the (a) component block copolymer is at least one member selected from the group consisting of styrene, α-methylstyrene, p-methylstyrene, vinylxylene, monochlorostyrene, fluorostyrene, dichlorostyrene, monobromostyrene, dibromostyrene, fluorostyrene, p-t-butylstyrene, ethylstyrene and vinylnaphthalene.

7. The thermoplastic polymer composition according to claim 5, wherein the conjugated diene compound of the (a) component block copolymer is at least one member selected from the group consisting of 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene, straight chain conjugated pentadiene, substituted conjugated pentadienes, straight chain conjugated hexadiene and substituted conjugated hexadienes.

8. The thermoplastic polymer composition according to claim 1, wherein the (a) component block copolymer has a weight average molecular weight of 10,000–500,000.

9. The thermoplastic polymer composition according to claim 1, wherein the hydrogenated product of the block copolymer as the (a) component is a styrene-ethylene-propylene block copolymer or a styrene-ethylene-butylene block copolymer.

10. The thermoplastic polymer composition according to claim 1, wherein the (b) component thermoplastic polyurethane elastomer is one prepared by subjecting a long chain polyol, a short chain glycol and a diisocyanate to addition polymerization.

11. The thermoplastic polymer composition according to claim 10, wherein the long chain polyol is poly-(1,4-butylene adipate), poly(1,6-hexane adipate), polycarpolatone, polyethylene glycol, polypropylene glycol or polyoxytetramethylene glycol.

12. The thermoplastic polymer composition according to claim 10, wherein the short chain glycol is ethylene glycol, 1,4-butanediol or 1,4-hexanediol.

13. The thermoplastic polymer composition according to claim 10, wherein the diisocyanate is tolylene diisocyanate, 4,4'-di-phenylmethane diisocyanate, hexamethylene diisocyanate or isophorone diisocyanate.

14. The thermoplastic polymer composition according to claim 1, wherein the (c) component is the (c-1) component copolymer.

15. The thermoplastic polymer composition according to claim 14, wherein the (c-1) component copolymer is a copolymer of an alkenyl aromatic compound selected from the group consisting of styrene, α-methylstyrene, p-methylstyrene, vinylxylene, monochlorostyrene, dichlorostyrene, monobromostyrene, dibromostyrene, fluorostyrene, p-t-butylstyrene, ethylstyrene and vinylnaphthalene, with an unsaturated carboxylic acid selected from the group consisting of maleic acid, fumaric acid, itaconic acid, acrylic acid, crotonic acid and cis-4-cyclohexene-1,2-dicarboxylic acid or anhydride or imide of the acid.

16. The thermoplastic polymer composition according to claim 15, wherein the (c-1) component is a copolymer of styrene with maleic anhydride.

17. The thermoplastic polymer composition according to claim 1, wherein the (c) component is the (c-2) component modified (co)polymer, its hydrogenated product or a mixture of the two.

18. The thermoplastic polymer composition according to claim 17, wherein the modified (co)polymer is an isocyanate-modified homo- or co-polymer obtained by homopolymerizing a conjugated diene compound or an alkenyl aromatic compound or random- or block-copolymerizing a conjugated diene and an alkenyl aromatic compound with a lithium type initiator and then reacting the homopolymer or copolymer obtained with an isocyanate at the terminals.

19. The thermoplastic polymer composition according to claim 18, wherein the conjugated diene compound is a member selected from the group consisting of 1,3-butadiene, 2-methyl-1,3-butadiene, 2,3-dimethyl-1,3-butadiene, 2-neopentyl-1,3-butadiene, 2-chloro-1,3-butadiene and 2-cyanopentyl-1,3-butadiene, the alkenyl aromatic compound is selected from the group consisting of styrene, u-methylstyrene, p-methylstyrene, vinylxylene, monochlorostyrene, dichlorostyrene, monobromostyrene, dibromostyrene, fluorostyrene, p-t-butylstyrene, ethylstyrene and vinylnaphthalene, and the isocyanate is selected from the group consisting of aromatic diisocyanates, aromatic triisocyanates and aliphatic isocyanates.

20. The thermoplastic polymer composition according to claim 19, wherein the conjugated diene compound is 1,3-butadiene or 2-methyl-1,3-butadiene, the alkenyl aromatic compound is styrene and the isocyanate is an aromatic diisocyanate selected form the group consisting of 2,4-tolylene diisocyanate, diphenylmethane diisocyanate and naphthalene diisocyanate.

21. The thermoplastic polymer composition according to claim 1, wherein the (a) component/the (b) component weight ratio is 5/95–95/5 and the proportion of the (c) component is 2–80 parts by weight per 100 parts by weight of a total of the (a) component and the (b) component.

22. The thermoplastic polymer composition according to claim 1, which further contains at least one additive selected from the group consisting of fillers, reinforcing agents, plasticizers, antioxidants, ultraviolet absorbers, antistatic agents, flame retardants, lubricants, foaming agents, coloring agents, pigments, nucleating agents, crosslinking agents, crosslinking coagents, rubbery polymers and thermoplastic resins.

* * * * *